United States Patent [19]
Goecke et al.

[11] 3,733,089
[45] May 15, 1973

[54] HITCH ATTACHMENT TO CONVERT A TRAILER-VEHICLE HITCH APPARATUS TO A TRAILER-FARM TRACTOR HITCH APPARATUS

[76] Inventors: Earl E. Goecke; Ronald D. Goecke, both of State Center, Iowa 50247

[22] Filed: Jan. 17, 1972

[21] Appl. No.: 218,172

[52] U.S. Cl..........280/415 A, 280/423 R, 280/491 E
[51] Int. Cl..........................E62d 53/00, B62d 53/08
[58] Field of Search ......................280/415 B, 415 A, 280/415 R, 423 R, 491 E, 491 R

[56] References Cited

UNITED STATES PATENTS

| | | | |
|---|---|---|---|
| 2,848,252 | 8/1958 | Martin | 280/415 B |
| 3,698,740 | 10/1972 | Chisholm et al. | 280/491 E X |

FOREIGN PATENTS OR APPLICATIONS

| | | | |
|---|---|---|---|
| 701,072 | 1/1965 | Canada | 280/423 R |

Primary Examiner—Leo Friaglia
Attorney—Rudolph L. Lowell

[57] ABSTRACT

The hitch attachment is adapted for use with a type of hitch apparatus now in general use for connecting the tongue of a stock trailer or the like with the floor of the box of a pickup truck. In this hitch apparatus a hitch ball secured to and projected upwardly from the box floor is received within a ball socket carried at the lower end of a front upright section that forms part of a tongue structure of a gooseneck type. The attachment is of a greater length than the front upright section and is pivoted at one end to the top of the upright section for swinging movement to a first storage position extended rearwardly from the top of the upright section for support on the upper side of the tongue structure and to a second working position projected longitudinally of and downwardly from the upright section. In this second position a hitch ball on the attachment is received in locked engagement within the ball socket on the upright section and a clevis at the lower end of the attachment is connectible with the draw bar of a farm tractor.

6 Claims, 6 Drawing Figures

PATENTED MAY 15 1973 3,733,089
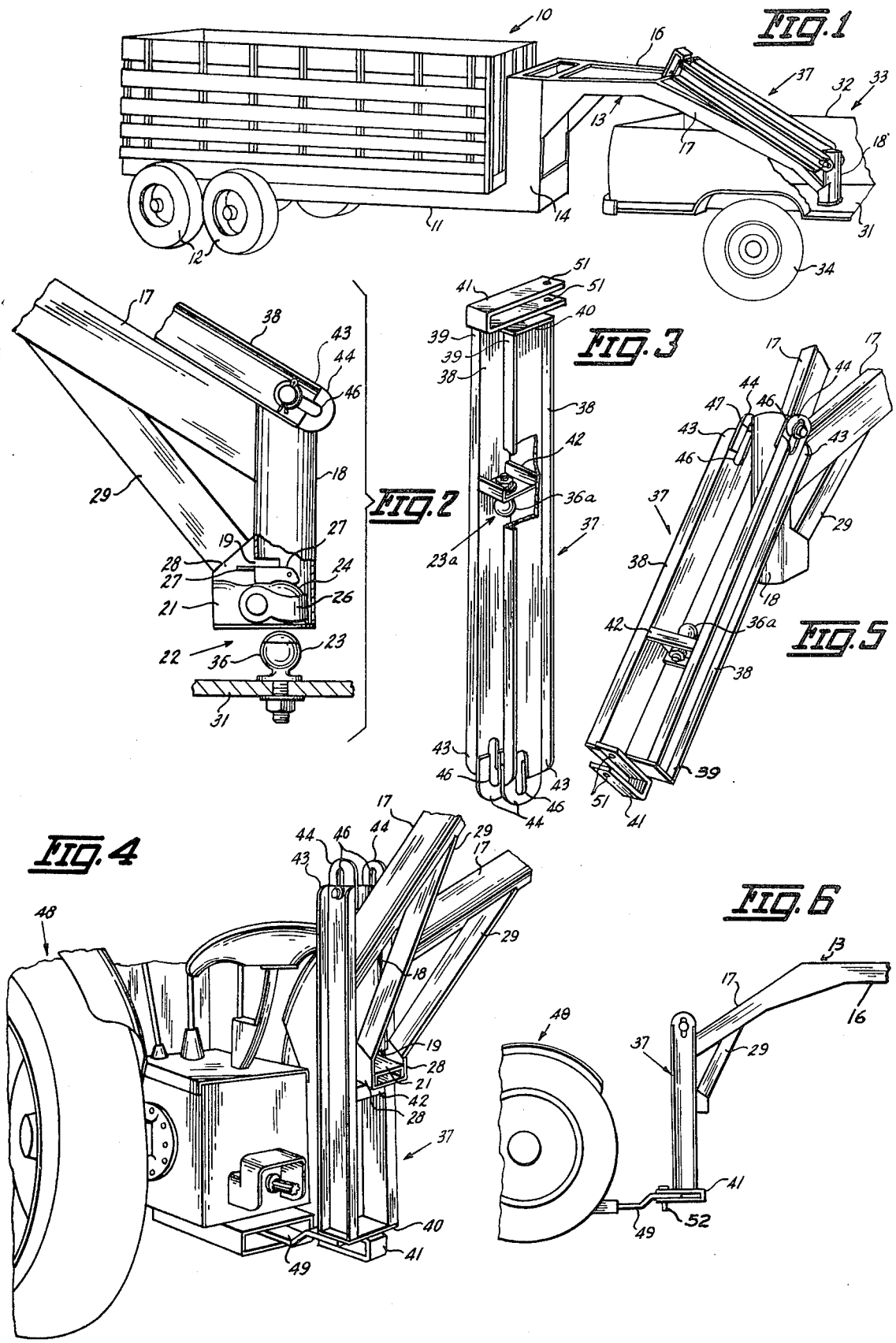

HITCH ATTACHMENT TO CONVERT A TRAILER-VEHICLE HITCH APPARATUS TO A TRAILER-FARM TRACTOR HITCH APPARATUS

SUMMARY OF THE INVENTION

The hitch attachment is of a unit Construction and adapted to be secured at all times to a part of the hitch apparatus of the trailer-vehicle combination. When not in use the attachment is moved to a rest or storage position supported on the top side of the trailer tongue structures so as not to interfere with the normal use and operation of the trailer-vehicle hitch apparatus. To convert the hitch apparatus for connection with a farm tractor it is only necessary to swing the attachment forwardly from the storage position to an upright working position at the front end of the trailer tongue structure. The attachment is releasably locked in its working position by connecting the part of the hitch apparatus that is carried on the tongue structure with a coacting hitch part on the attachment. With the attachment in a working position a clevis at its lower end is connectible with the draw bar of a tractor. The attachment constitutes a downwardly projected extension at the front end of the tongue structure to provide for a transport position of the trailer corresponding substantially to its transport position in the trailer-vehicle combination.

BRIEF DESCRIPTION OF THE DRAWING

FIG. 1 is a perspective view of a trailer and pickup truck combination showing the hitch attachment of this invention in a rest or storage position;

FIG. 2 is an enlarged detail view of the hitch apparatus, shown generally in FIG. 1, with parts broken away and other parts shown in section to more clearly illustrate its construction;

FIG. 3 is an inverted perspective view of the hitch attachment of this invention;

FIG. 4 shows the hitch attachment in a working position with the hitch mechanism on the trailer tongue providing for the connection of the trailer with a farm tractor;

FIG. 5 shows the hitch attachment in a moved position relative to the hitch mechanism on the trailer tongue that is intermediate the storage position of FIG. 1 and the working position of FIG. 4; and FIG. 6 is a diagrammatic showing of trailer-farm tractor combination.

DETAILED DESCRIPTION OF THE INVENTION

Referring to the drawings, there is shown in FIG. 1 a stock trailer 10 having a frame 11 carried on ground wheels 12 and provided with a gooseneck type tongue structure 13 that includes an upright base section 14 mounted on the front end of the trailer frame 11. A rear section 16 projects forwardly from the upper end of the base section 14 in a direction longitudinally of and in a parallel relation with the frame 11 and carries a forwardly and downwardly inclined intermediate section 17 that terminates in an upright front section 18. The base section 14 and front section 18 are in a substantially parallel relation.

The front section 18 (FIG. 2) is of a tubular construction and has a cutaway portion 19 in the rear portion of its lower end to provide for the positioning and mounting within such lower end of the socket unit 21 of a hitch apparatus 22 that also includes a ball unit 23. This hitch apparatus 22 is of a commercial type made by the Atwood Vacuum Machinery Company of 1400 Eddy Street, Rockford, Illinois. The socket unit 21 includes a ball receiving shell 24 that is suitably equipped with a releasable ball locking mechanism 26 that has a manually actuated release member 27 accessible through the cutaway portion 19. A pair of mounting plates 28 (FIGS. 2 and 4) projected rearwardly from opposite sides of the cutaway portion 19 are connected to the iNtermediate section 17 of the tongue Structure 13 by brace members 29. A rear portion of the shell 24 extends between the mounting plates 28 for securement thereto as by weldments (not shown).

The ball unit 23 is illustrated as being mounted to the floor 31 of the box 32 of a pickup truck 33, only the rear portion of which is shown, at a position forwardly of the truck rear wheels 34 (FIG. 1). With the ball member 36 of the ball unit 23 received in locked engagement within the socket unit 21, the rear section 16 of the tongue structure extends horizontally in a clearance relation with the upper side of the truck box 32 to permit adequate turning movement of the trailer 10 relative to the truck 33. Importantly, and as appears in FIG. 1, the trailer frame 11 is also extended horizontally for ground clearance and stock hauling purposes.

The hitch attachment 37 of this invention converts the hitch apparatus 22 of the trailer-truck combination for use in a trailer-farm tractor combination with an expenditure of a minimum of time and effort. The attachment (FIG. 3) includes an elongated body structure comprised of a pair of transversely spaced side members 38 of a channel iron construction and arranged with their open sides faced outwardly. The side members 38 are connected together at one of their ends 39 by a transversely extended mounting plate 40. Secured to the plate 40, as by welding, so as to be located outwardly from the side member ends 39 is a clevis member 41 the legs of which extend transversely of the side members 38 with their free ends projected laterally outwardly from the side members.

Intermediate the ends thereof the side members 38 are connected together by a second mounting member 42 of a channel construction having its open side facing toward the ends 39 of the side members. A ball unit 23A, similar in all respects to the ball unit 23, is secured to the mounting member 42 with the ball member 36A thereof open to the ends 43 of the side members 38. At their ends 43 the side members 38 are provided with extension plates 44 rigidly secured to the inner surfaces of the side members. The plates 44 and webs of the members 38 are formed with transversely opposite elongated openings 46 that extend longitudinally of the side members 38.

In the assembly of the hitch attachment 37 with the tongue structure 13 the extension plates 44 are arranged at opposite sides of the upper end of the front section 18 for pivotal connection therewith by a pivot shaft 47 extended through the openings 46 and diametrically aligned openings (not shown) formed in the upper end of the front section 18. The longitudinal length of the front section 18 is approximately equal to that length of the side members 38 located between the mounting plate 42 and the side member ends 43. Thus, on pivotal movement of the attachment 37 to a working position in longitudinal alignment with the front section 18, the elongated openings 46 permit the ball member 36A of the ball unit 23A to clear the lower end of the front section for movement to a position opposite the shell 24 of the socket unit 21. In such position the ball member 36A is releasably locked within the socket unit 21 in response to a relative longitudinal movement between the attachment 37 and the front section 18. This movement is permitted by the elongated openings 46. On engagement of the ball member 36A within the socket unit 21 the attachment 37 is locked against both longitudinal and lateral movement relative to the front section 18.

With the hitch attachment 37 thus assembled with the front section 18 the trailer 11 and a farm tractor 48 (FIG. 4), to which the trailer is to be connected, are relatively maneuvered to locate the tractor draw bar 49 within the clevis 41 for draft connection by a usual connecting pin 52 (FIG. 6) extended through the draw bar 49 and aligned openings 51 formed in the free ends of the clevis leg members. The length of the attachment side members 38 from the mounting plate 42 to their ends 43 is predetermined such that when the trailer 10 and the tractor 48 are in a draft connection, as shown in FIGS. 4 and 6, the hitch attachment is in a substantially vertical position to in turn provide for a horizontal positioning of the trailer frame 11. Stated otherwise the attachment 37 constitutes a downward extension on the front section 18 of the tongue structure 13 to compensate for the distance the tractor draw bar 49 is located below the floor 31 of the truck box 32.

When it is desired to connect the trailer 10 with the truck 33, the ball member 36A is disconnected from the socket unit 21 by manipulation of the ball release lever 27. With the ball member 36A released, the attachment 37 is permitted to drop a distance defined by the engagement of the pivot shaft 47 with the upper ends of the elongated openings 46 whereby the attachment is then freely swingable relative to the front section 18. The attachment is then swung upwardly and rearwardly relative to the front section 18 to a storage position in resting engagement on the upper surface of the tongue structure intermediate section 17, as illustrated in FIGS. 1 and 2. In this rest or storage position, the hitch attachment 37 is retained pivotally connected with the tongue structure 13 without in any way interfering with the normal use of the hitch apparatus 22 in the trailer-truck combination.

Although the invention has been described with respect to a preferred embodiment thereof, it is to be understood that it is not to be so limited since changes and modifications can be made therein which are within the full intended scope of this invention as defined by the appended claims.

We claim:

1. A hitch attachment for converting the hitch apparatus of a vehicle-trailer combination for connection of the trailer with the draw bar of a farm tractor wherein said trailer includes a frame having a tongue structure with a front upright section and a hitch ball-receiving socket at the lower end of said front section, and said vehicle has a hitch ball receivable in said socket, said hitch attachment comprised of:
   a. an elongated body member having a hitch ball mounted intermediate the ends thereof and facing one end thereof and a clevis member secured to the opposite end of said body member, and
   b. means for movably connecting the one end of said body member to the upper portion of said front section to provide for movement of the body member to a first position extended longitudinally of said front section and projected downwardly therefrom and to a second position extended rearwardly from said upper portion for resting engagement on the top side of the tongue structure,
   c. said hitch ball in the body member, in said first position of the body member, being receivable in locking engagement within said hitch ball-receiving socket, and said draw bar receivable within said clevis for connection therewith.

2. The hitch attachment according to claim 1, wherein:
   a. the distance between the ball member on said body member and the one end of said body member is substantially equal to the length of said front section, and
   b. the distance between the hitch ball on the body member and the opposite end of the body member is such that when the body member is in the first position and connected with the tractor draw bar the trailer frame is in a substantially horizontal position.

3. The hitch attachment according to claim 1, wherein:
   a. said body member is formed of a pair of transversely spaced side members and said body member hitch ball is positioned between said side members whereby on movement of the body member to said first position said side members are located at opposite sides of said front section.

4. A hitch attachment providing for the connection with the draw bar of a farm tractor of a vehicle trailer having a tongue structure with a forwardly and downwardly inclined section terminating in an upright front section having a hitch ball-receiving socket at the lower end thereof, said attachment including:
   a. a pair of transversely spaced side members,
   b. a hitch ball located between and mounted on said members intermediate the ends thereof so as to extend toward one of the ends of said side members,
   c. a clevis unit located outwardly from and connected to the other ends of said side members, and
   d. means for movably connecting the one ends of said side members to the top portion of said upright section to provide for movement of said attachment to a first position extended longitudinally of and above said inclined section and to a second position extended longitudinally of said front section so as to constitute a downward extension thereof,
   e. said hitch ball, in said second position, being receivable in said ball-receiving socket to releaseably lock the attachment against movement relative to said front section and said draw bar being receivable within said clevis for connection therewith.

5. The hitch attachment according to claim 4, wherein:
   a. said movable connecting means includes a pivot shaft mounted on and extended transversely of the top portion of said front section, and
   b. said side members are formed at the one ends thereof with transversely opposite longitudinally extended openings for receiving said pivot shaft, whereby said attachment in the second position therefor is movable longitudinally of said front section to connect and disconnect said hitch ball relative to said ball-receiving socket.

6. The hitch attachment according to claim 4 wherein:
   a. said attachment, in the first position, is in resting support on the upper surface of said inclined section.

* * * * *